April 29, 1958 J. W. VAN RIPER 2,832,879
TEMPERATURE CONTROL MECHANISM FOR EXTRUSION APPARATUS
Original Filed July 29, 1954 4 Sheets-Sheet 1

INVENTOR.
JURIAN W. VAN RIPER
BY Alfred W. Nibber
ATTORNEY

April 29, 1958     J. W. VAN RIPER     2,832,879
TEMPERATURE CONTROL MECHANISM FOR EXTRUSION APPARATUS
Original Filed July 29, 1954     4 Sheets-Sheet 2
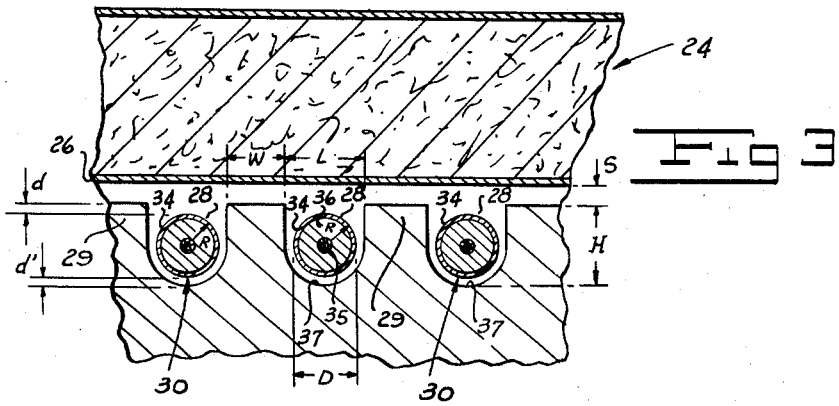
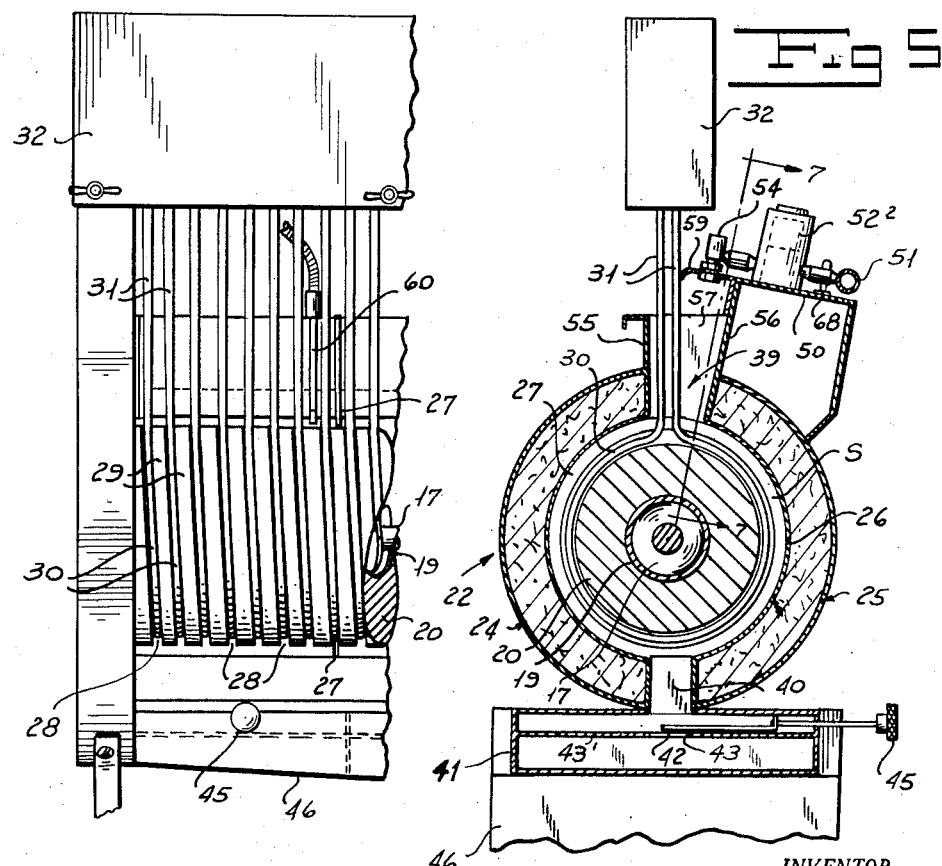
INVENTOR.
JURIAN W. VAN RIPER
BY *Alfred W. Vibber*
ATTORNEY

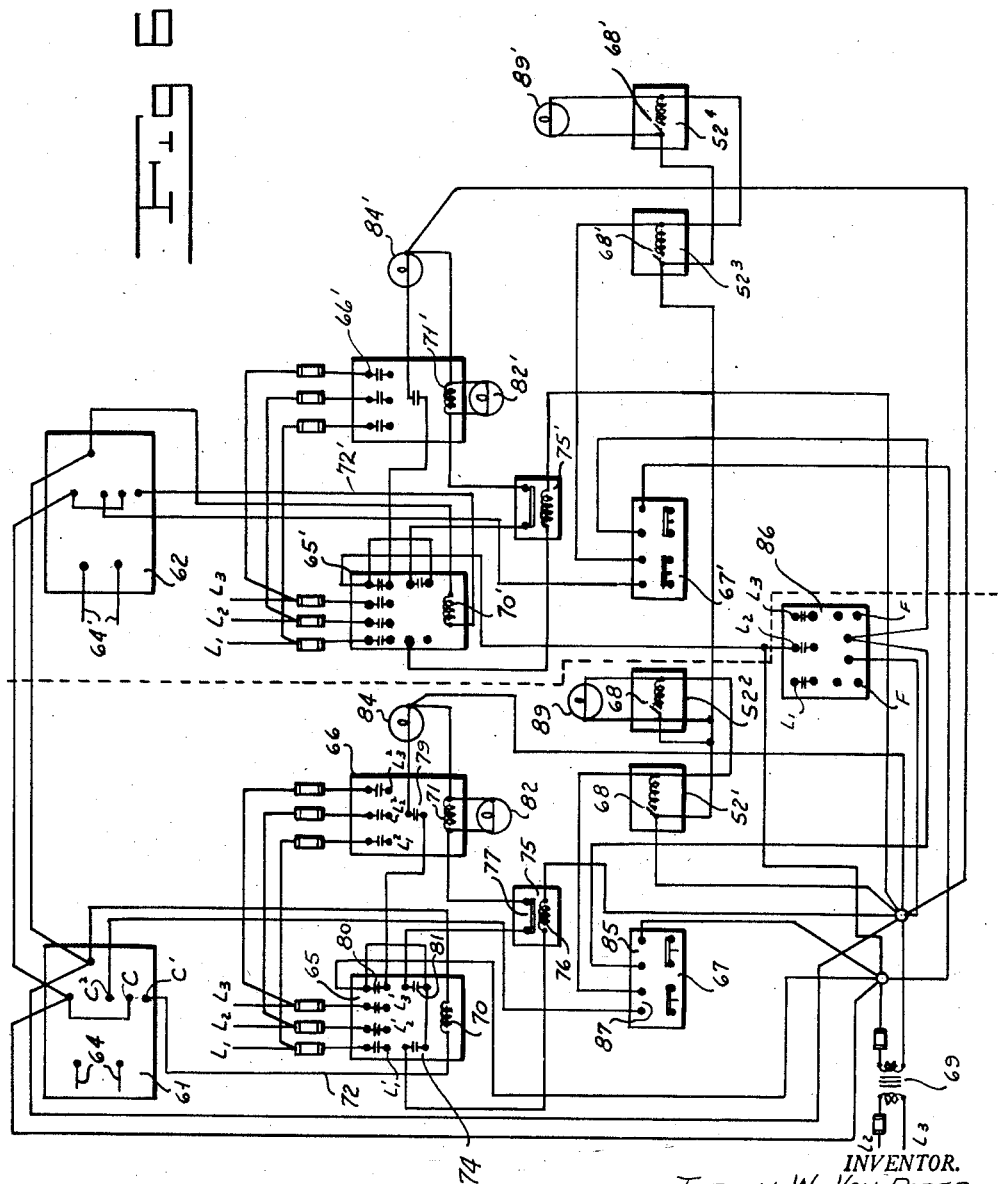

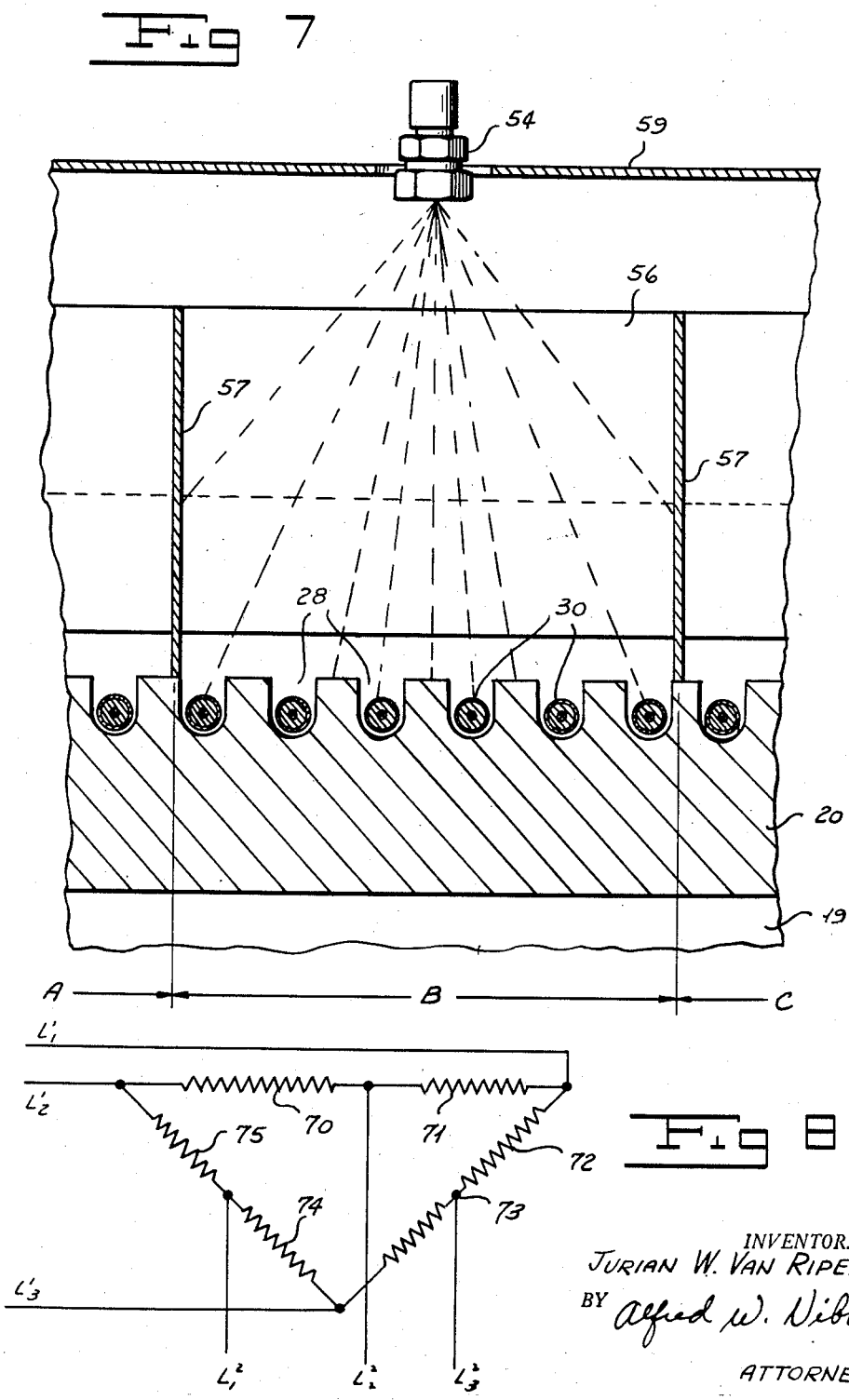

2,832,879

Patented Apr. 29, 1958

United States Patent Office

2,832,879

TEMPERATURE CONTROL MECHANISM FOR EXTRUSION APPARATUS

Jurian W. Van Riper, Ridgewood, N. J.

Original application July 29, 1954, Serial No. 446,480. Divided and this application April 17, 1957, Serial No. 653,407

11 Claims. (Cl. 219—20)

This invention relates to apparatus for selectively heating and cooling a body, whereby such body may be brought quickly to, and maintained at, a desired temperature. More particularly, the invention relates, in preferred embodiments thereof, to apparatus for selectively heating and cooling a part, such as a barrel or a delivery head, of a plastic material extruding machine through which the plastic material is conveyed, whereby such material may be brought quickly to a desired temperature and may be maintained thereat during its travel through the extruding machine part.

This application is a continuation-in-part of application Serial No. 342,543, filed March 16, 1953, now Patent 2,721,729, and a division of application Serial No. 446,480, filed July 29, 1954, now abandoned.

As above indicated, the invention in preferred embodiments thereof relates to the heating and cooling of a part of a plastic material extruding machine. The invention finds perhaps its greatest advantages in a barrel for a screw type extruding machine, the barrel being of appreciable length and the plastic material traveling through it and the head whereby such material is brought to and maintained at desired temperatures. The invention may also be used in connection with the delivery head of the machine, although for simplicity the heating and cooling means for the head and the control means therefor are omitted.

It is necessary to control the temperature of plastic material conveying and working parts, such as barrels and heads, of plastic material extruding machines. With the newer plastics the temperature of the material must be held fairly closely to an optimum temperature in each portion of the path of travel of the material to produce a satisfactory product. In the past, barrels and heads of extruding machines have been temperature controlled by the provision of jackets or chambers thereabout through which temperature controlling liquid was circulated. Such liquid heat controlling means, however, was bulky and expensive to make and operate, as well as being prone to various types of failures, including leakage of the heat transferring liquid at the various joints in the system. As a consequence, it has been attempted to dispense with liquid temperature controlling of parts, such as barrels of extruding machines, and to heat them electrically, as by the provision of electric heating bands around the barrel and to cool them by very limited water cooling passages interposed between the bands and the plastic material conveying passage in the machine part.

The described electric heating and water cooling of the barrel has not proved to be entirely satisfactory, since the barrel has been unevenly heated as a result of expansion of the bands and has been unevenly cooled, when cooling is necessary, because of the limited cooling passages. Yet another proposed structure employs as an extrusion barrel heating and cooling means a heavy walled metal sheath disposed around the barrel, the sheath having electric heating elements of the tubular resistance type embedded therein, there being gins on the outer surface of the sheath alternatively selectively to cool the barrel. Such latter construction is also deficient, because the sheath, being readily removable from the barrel, inherently has poor contact with the barrel, with accompanying poor heat transference aggravated by the expansion of the sheath as it is heated. Cooling of the barrel is also inefficient, because the heating means is interposed between the cooling surfaces and the barrel. In the main, prior proposed constructions employing electric heating means for the barrel or other part of the extruding machine have utilized separate surfaces built into the barrel for heating and cooling the barrel, either the heating or the cooling means being disposed closer to the bore through the barrel than is the other such means.

In my prior application Serial No. 342,543, I have described and claimed a temperature controlling means for a part, such as a barrel or delivery head of a plastic material extruding machine, wherein such part is selectively heated and cooled, the heating being effected by electric resistance heating means disposed about the part, the part being cooled by subjecting it to a cooling fluid such as air or a suspension of finely divided cooling liquid in air. In such construction, substantially the same external surfaces of the body, such as a barrel, are employed to receive radiant heat rays through space from the heating means as those which are contacted directly by the cooling fluid.

In accordance with the present invention, which represents an improvement upon the invention described in my above prior application, improved means is provided for controlling both the heating elements and the cooling means of the apparatus for controlling the temperature of a body such as a part of a plastic material extruding apparatus. In the present invention, a control means is employed for both the heating elements and the cooling means, the control means including means detecting the temperature of the body, preferably at zones spaced therealong. The control means alternatively energizes the heating elements and at the same time shuts off the flow of cooling fluid, when the body is too cold. When, on the other hand, the body is too hot, the control means deenergizes the heating elements and causes a flow of cooling fluid which impinges upon the body. Preferably, the cooling fluid employed is a suspension of atomized liquid in air, because of its high cooling capacity and because of its almost instant effect in abstracting heat and ceasing to abstract heat when turned on and off, respectively. Preferably, also, the control means is one which energizes the heating elements in varying degrees proportional to the instantaneous deviation of the temperature of the body from the desired temperature, when the body is too cold, and which causes a flow of cooling fluid in an amount proportional to the deviation of the temperature from the desired temperature, when the body is too hot. In the illustrated presently preferred embodiment of the invention, the control means actuates its controlled body heating and cooling means in cyclically recurring pulses of a duration proportional to the instantaneous deviation of the temperature of the body from the desired temperature.

The present invention has among its objects the provision of an economical, easily controlled, apparatus for selectively heating and cooling a body. In preferred embodiments of the invention such body is a barrel or a head of a plastic extruding machine.

The invention has as a further object the provision of the above temperature controlling means which is particularly characterized by the accuracy and speed of its temperature control in both the heating and cooling cycles.

Yet another object of the invention resides in the provision of improved apparatus for heating a part such as a barrel of a plastic extruding machine by electric resistance heating. In its preferred form such apparatus includes selectively operated switches whereby the electric resistance is subjected to different voltages to provide for different rates of heat input to the barrel as required.

A still further object of the invention, in presently preferred embodiments thereof, resides in the provision of an improved apparatus for cooling a body such as a barrel of a plastic extruding machine. In its preferred form such cooling means includes means to initiate the flow of cooling fluid, preferably a suspension of atomized liquid in air, in cyclically recurring pulses of a duration proportional to the deviation of the temperature of the body from the desired temperature when the body is too hot.

A still further object of the invention, in its illustrated embodiment, is the provision, in combination with a body to be selectively alternatively heated and cooled whereby to maintain its temperature within a relatively narrow temperature range, of control means including means detecting the temperature of the body, and means controlled thereby operable alternatively automatically to energize the heating means for the body and shut off the cooling means for the body, and to de-energize the heating means and start the operation of the cooling means. In their preferred forms in such combination the heating and cooling means are so constructed as to operate in accordance with the mode of operation of the preferred ones of such means set out in the preceding two paragraphs, respectively.

The above and further objects of the invention relating to economies of manufacture and operation will become more apparent in the following description of the invention.

My invention is clearly defined in the appended claims. Where parts are, for clarity and convenience, referred to on the basis of their oriented position shown in the accompanying drawing, no limitation as to positioning of the entire structure is to be implied, since it will be understood that the entire structure may be inverted or that it may be used in any inclined position. Also in both the description and the claims, parts at times may be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawing forming part of this specification, in which:

Fig. 3 is an enlarged fragmentary view of an outer portion of the barrel and of the sheath confronting the barrel, such view being a cross section similar to that at the right of Fig. 2.

Fig. 4 is a fragmentary view in elevation of the front of the barrel of the machine, the half section of the sheath or housing for the barrel which lies nearer the reader being removed.

Fig. 5 is a view in vertical section through the barrel and sheath, the section being taken along the line 5—5 in Fig. 1, the heating element terminal containing housing at the top of the sheath being shown in end elevation.

Fig. 6 is a wiring diagram for the temperature control apparatus of the invention.

Fig. 7 is an enlarged fragmentary view in section through a portion of the barrel and sheath, the section being taken along the line 7—7 in Fig. 5 at the location of intermediate zone B, the plastic material working and forwarding screw being omitted.

Fig. 8 is a somewhat simplified schematic wiring diagram indicating the manner of connection of the heating elements in a bank of such elements associated with one section of the barrel.

Figure 1:
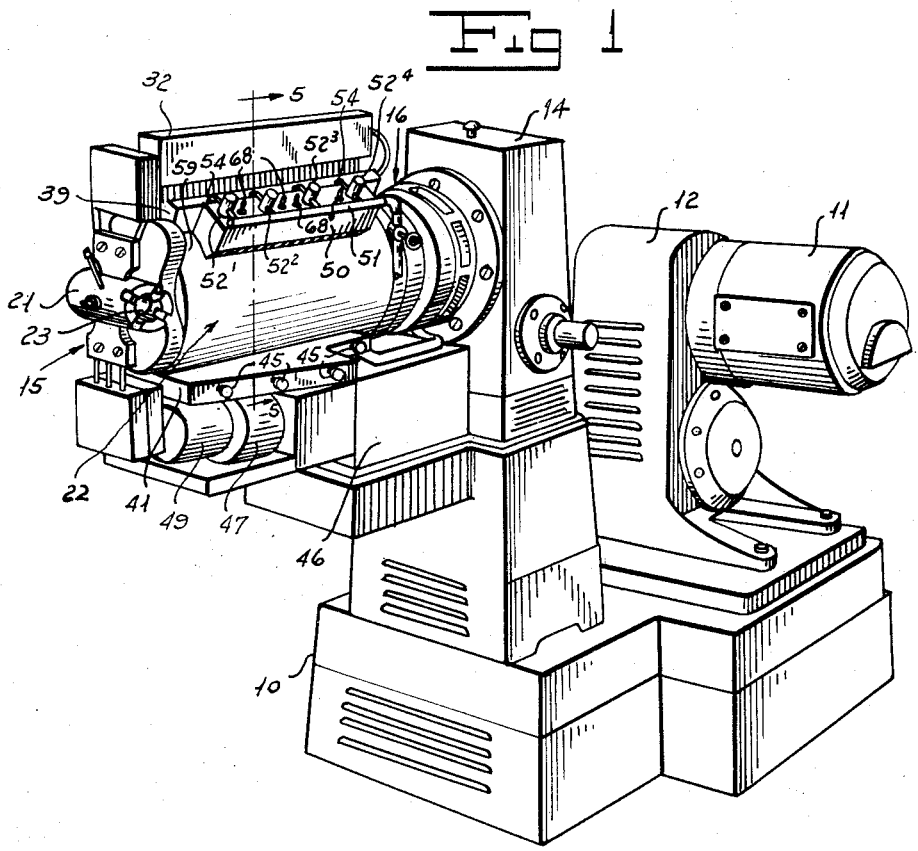
Fig. 1 is a view in perspective of a plastic material extruding machine having a screw-containing barrel which incorporates a temperature control mechanism made in accordance with the present invention.
Figure 2:
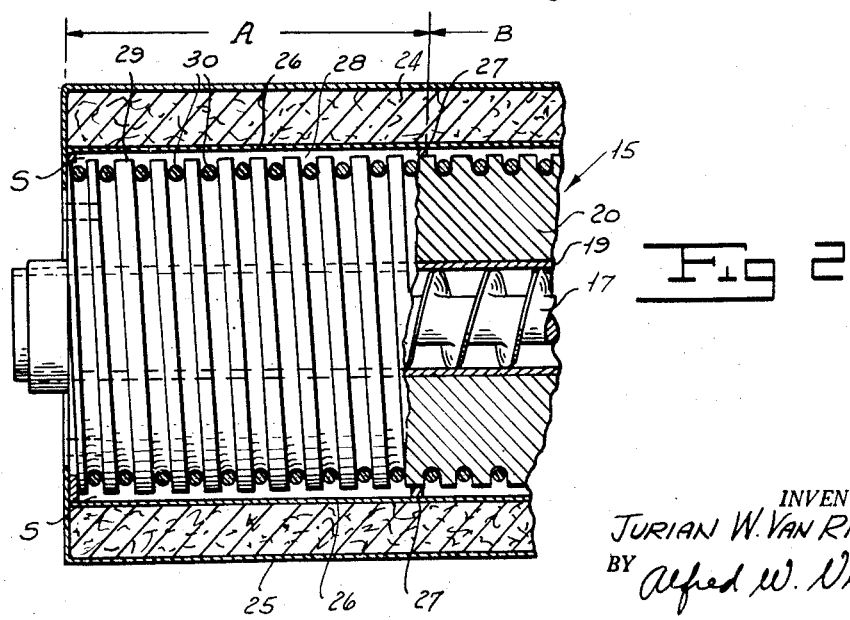
Fig. 2 is a fragmentary view of a portion of the forward end of the barrel of the extruding machine and of the sheath thereon, a portion of the barrel and sheath, at the right, being shown in generally horizontal section and the portions of the barrel at the left being shown in elevation.

In Fig. 1 of the drawings there is shown a typical screw type continuous extrusion machine for use with plastic material such as rubber, nylon, polyethylene, etc. Such machine is provided with the conventional base 10 supporting the motor 11 which drives through the variable speed transmission means 12 into the gear box 14. Bolted to such gear box is the barrel, generally designated 15, such barrel having a hopper portion 16 into which the plastic material to be worked and extruded is initially introduced. Such plastic material is worked and forwarded by the screw 17 (Fig. 2) rotating in the thin cylindrical hardened liner 19 which fits tightly within the heavy walled main barrel portion 20. The screw 17 delivers the plastic material to the extrusion head 21 which, in the machine shown, is of the side delivery type for the sheathing of elongated materials such as wires. The head has a delivery orifice 23 from which the sheathed conductor issues.

From immediately forward of the hopper portion 16 to its delivery end, the barrel 15 is provided with an insulating sheath 22 made of two generally semi-cylindrical sections 24 (away from the reader in Fig. 1) and 25 (nearer the reader in Fig. 1). Sections 24 and 25 have their lower edges confronting each other, and as shown in Fig. 5, generally enclose the barrel, except for the upper opening 39 leading to the space S between the inner sheet metal member 26 of the sheath and the barrel, and the air outlet opening 40 at the bottom of each zone of the sheath. The heating and cooling means for the barrel in this instance are divided into four zones spaced longitudinally of the barrel, that at the left in Fig. 2 being designated A, the section adjacent thereto being partially shown in that figure at B, and the zone adjacent zone B and nearer the hopper being designated zone C (Fig. 7). The space S between the inner sheath member 26 and the barrel is separated at the juncture between adjacent zones by C-shaped sealing baffles 27 which are open at the top and extend from the bottom of the barrel up along the sides thereof.

As shown in Figs. 2 and 3–5, inclusive, the main body 20 of the barrel of the extruding machine is provided on its external peripheral surface substantially throughout its length with a helical land 29, adjacent turns of such land being spaced by a groove 28 lying therebetween. In each turn of the groove 28 there is disposed an electrical resistance heating unit 30. Each unit 30 is made with a body in the shape of a helix of one turn, the straight vertical leads 31 from each unit 30 extending vertically up into the junction box 32. The leads from the successive resistance units lie immediately adjacent each other, that is, the leading end of one unit lies adjacent the trailing end of its neighbor, so that the resistance heating units are distributed substantially uniformly along the length of the barrel.

As shown more clearly in Fig. 3, the preferred cross section of heating element 30, which is of the well-known "Calrod" type, is circular, such element being provided with a sheath 34, preferably made of stainless steel, a central, electrically conducting, resistance wire 35, and insulating material 36 interposed between the resistance wire and the sheath. In the embodiment shown, the groove 28 has approximately straight side walls the elements of which lie approximately normal to the periphery of the barrel 15. The root 37 of groove 28 is approximately semi-circular in axial cross section, such root having a radius R which somewhat exceeds the radius of the heating unit 30. In the drawings, for clarity of illustration, the difference between the radius R and the radius of element 30 is exaggerated. The cross section of groove 28 and the cross section of the heating element 30 are so related to each other as to leave within the groove, when the heating element is mounted therein, a substantial space at at least one side of the groove and preferably, as shown, at both, throughout the predominant part of the length of the groove. In Fig. 3 the top surface of element 30 is shown lying a distance $d$ below the tops of the land 29. With such construction there is provided a substantial space within each groove for the reception of the cooling fluid directed thereto by means to be explained, and also there is provided a substantial height of land side wall at each side of the heating element to intercept the radiant heat rays emanating from such element, both directly and as reflected from the inner wall member 26, which preferably is made of polished stainless steel. As a practical lower limit of height of the lands, when the heating element is circular in cross section, the tops of the lands may lie flush with the top of the heating element 30. From such lower limit, the land 29 may increase in height relative to the diameter of the element 30 to the relationship shown in Fig. 3 and past such relationship, depending upon the speeds and amounts of heating and cooling effects required. The width L of the groove 28 is, in the embodiment shown, somewhat less than the width W of the land 29. Such relationship is not critical, however, the width W depending upon the length of the barrel and the effective length of heating element required to be disposed upon such barrel to give the heating capacity and speed of heating desired for the particular application in hand, and should be sufficiently wide to conduct heat at the required rate of flow both during the heating and cooling operations.

As shown in Fig. 3 the width L of the grooves somewhat exceeds the diameter D of the heating element 30. Also as shown a space having a width $d'$ exists between the bottom of the turn of element 30 at the right and the bottom of the groove in which it is positioned. In a typical apparatus made in accodance with the invention the width L of the groove is .500 inch and the diameter D of element 30 is .440 inch, giving an average of .030 inch between the side wall of the groove and the sheath of element 30.

The groove 28 in the barrel may be formed during the casting of the barrel. Alternatively, the thus cast barrel may be subsequently rough finished by a machining operation. Further, the groove 28 may be formed entirely by rough machining. Each of the spiral heating elements 30 is preferably formed by being wound on a mandrel spirally grooved in a manner to conform in pitch and generally in the inner diameter of the helix to the groove on the barrel. The thus formed spiral heating elements may be unscrewed from the mandrel and may be mounted on the barrel by being screwed endwardly thereonto. Preferably the inner diameter of the helix of the mandrel slightly exceeds the inner diameter of the helical groove on the barrel, so that the thus formed helical heating elements, which have an inherent spring-back, may be easily threaded or screwed onto the barrel. Even if the inner diameter of the helical groove on the mandrel were the same as that of the groove in the barrel, however, the heating element thus formed could be screwed onto the barrel because the inherent spring-back of the "Calrod" element upon being bent causes its helix to be of a larger diameter than the helix of the groove in the mandrel. Further, the element may be formed by being coiled directly into the groove on the barrel, here again the spring-back of the element insuring adequate spacing between it and the walls and root of the groove.

The inner diameter of each of the helical heating elements 30 is preferably such that when the elements are at the average temperature of the barrel under working conditions, but are not themselves heated by electricity, a space about equal to the average space between the elements and the side walls of the groove exists between the inner surfaces of the elements and the root of the groove. The space between the inner surfaces of the elements and the root of the groove grows larger when the elements 30 are heated by the passage of electricity therethrough, due to expansion of the elements when so heated. Thus even if the elements could be made to lie snugly in contact with the root of the groove in the barrel when initially mounted on the barrel in the cold, such elements in the main would pull at least slightly away from the bottom of the groove under operating conditions, insuring the proper spaced relationship between the heating element and the bottom of the groove.

The described relations of the diameter of the section of the heating element 30 and of the inner diameter of its helix relative to the width L of the groove 28 and the inner diameter of the helix of the groove cause the heating element throughout by far the predominant part of its length to lie separated from the bottom and side walls of the groove 28 even though it is supported directly therein. The "Calrod" element varies somewhat in diameter angularly about its axis. The groove 28 preferably is at most merely rough machined. The spiral into which element 30 is formed is not an absolutely true helix because of the tendency of the sheath of the element to spring back in both radial and axial directions. As a result, the helical element 30 contacts the bottom and side walls of groove 28 merely at points or short lines which in the main are widely spaced from each other along the length of the element 30, by far the greater part of the length of element 30 being suspended in the groove 28 free from contact therewith.

In Fig. 7 there is illustrated a fragment of the typical zone B of the machine, and in Fig. 8 there is illustrated the manner of connection of the heating elements therefor in accordance with the invention when the heating elements are supplied by a 220 volt three-phase alternating current source. The individual electric resistance heating units 30 are arranged in multiples of two which are connected together, in the manner shown in Fig. 8, in a delta arrangement such that sets of two units, 70, 71; 72, 73; 74, 75; connected in series constitute the respective sides of the delta. The heating circuit for the machine is supplied, in a manner more fully to be explained, from the three-phase alternating current source $L_1$, $L_2$, and $L_3$. The leads from such source are selectively connected through a contactor, which is under the control of a barrel temperature sensing element, so that each of the six heating units in the delta, when energized, is subjected, under a first operating condition, to full voltage, 220 volts, and under a second operating condition, to half voltage, 110 volts, thereby to decrease the rate of heat input into the barrel.

It is to be understood that variations in the number of heating elements employed in a zone are possible. Thus if a zone requires the use of eight heating elements, with a 220 volt three-phase source, the extra two elements are connected in series across one phase of the source, in parallel with, say, elements 72 and 73, and with the midpoint of the two extra elements connected to the mid-point of elements 72 and 73. It will also be understood that sets of six heating elements, or an added even number thereof connected as above, may be disposed along subzones of the barrel, and that such sets, connected in parallel, may be under the control of one instrument such as instrument 61, to be explained in connection with Fig. 6.

Each of the various zones of the barrel length is also selectively cooled by a means also under the control of the barrel temperature sensing device for such zone. In the particular machine shown the barrel, as noted, is divided into four zones. It is obvious that the number of zones employed will depend on the length of the barrel, closeness of zone temperature control, etc. As above set forth, each zone of the space S between the barrel and the inner member 26 of the sheath is provided with an upper air inlet opening 39, located between the spaced vertical partitions 57 aligned with the respective annular separator 27, and the elongated air outlet opening 40 positioned centrally longitudinally of each zone at the bottom thereof. Positioned beneath the bottom of the sheath 22 is a horizontal exhaust duct and drip pan 41 from which water may be drained from time to time through a discharge means not shown, there being a laterally adjustable damper 42 positioned, in effect, between the duct and each of the exhaust openings 40. Each damper adjustably covers its respective hole 43 in the horizontal partition member 43' forming separate sub-compartments between each opening 40 and the duct 41. As shown in Fig. 5, each damper 42 consists of a flat slidable sheet metal member which is slid laterally to the desired position by the knob 45 so that it covers the bottom end of the opening 40 to the desired degree. Duct 41 communicates with the air exhaust chamber 46 to which is attached the suction blower 47 driven by the blower motor 49.

Each zone of the barrel defined by the members 27 and 57 may be selectively cooled, when the barrel temperature sensing means requires it, by being subjected selectively to contact with either a flow of cooling air impelled by blower 47 or a suspension of finely divided cooling liquid in air, also impelled around the zone of the barrel by blower 47. The suspension of finely divided liquid in air for cooling each such zone is created by the fan type spray nozzle 54 which, as shown in Fig. 7, is disposed longitudinally centrally above the zone and, as shown in Fig. 5, is directed downwardly substantially radially of the barrel. The spray nozzles are mounted on the support 50 extending upwardly above the outer surface of sheath 22. The nozzles are supplied with water from the manifold 51, each nozzle being under the control of its individual solenoid valve $52'$, $52^2$, $52^3$, $52^4$, each such valve being closed when its solenoid is de-energized and open when the solenoid is energized. As indicated in Figs. 5 and 7, the upper confronting edge portions 55 and 56 of sheath sections 24 and 25 are extended to provide a trough for the reception of the water spray, the trough being divided into sections by the aforesaid members 57 so that the spray from each nozzle affects only its own zone of the barrel. A laterally extending annular cover member 59, through spaced holes in which the lower parts of the spray nozzles extend, is provided to prevent the splashing of liquid over the exterior of the machine.

In the machine shown there are provided two thermocouples, one being shown at 60, which are spaced along the length of the barrel and which extend into deep radial bores in the main barrel portion 20 to a location close to the liner 19. One such thermocouple is located adjacent the boundary between zones A and B, and the other is located adjacent the boundary between the other two zones. Elements 60 thus detect the temperature at the interior of the barrel and thus the temperature of the plastic material traveling therethrough. In the machine shown, the forward thermocouple 60 is arranged to control the selective operation of the heating and cooling means for the two zones A and B of the barrel adjacent the head 21, and the rear thermocouple is designed to control the heating and cooling means for the other two zones of the barrel, zone C and that adjacent the hopper portion.

The control means, to be explained more fully in conjunction with Fig. 6, functions so that if the thermocouple senses a temperature less than that preset on the operating controller, it turns off the cooling means and turns on the heating means. The illustrated preferred control means energizes the heating elements in cyclically recurring pulses the duration of which is proportional to the deviation of the temperature of the barrel from the desired temperature thereof, first in such manner as to provide for the maximum rate of input of heat and subsequently at a lower rate of heat to the barrel. When the demands of the thermocouple are satisfied, both the heating and cooling means are de-energized. When the thermocouple is subjected to a temperature higher than that preset on the controller, the heating means remains de-energized and the cooling means is started. When the switch 67 of the controlling means is in position for fast cooling of the zone of the barrel, this involves opening the solenoid valve for the spray nozzle, the suspension of atomized liquid in air being drawn by the blower around the barrel in both directions and out the exhaust opening 40 under the influence of the blower 47.

The atomized water-air mixture bathes each of the heating elements 30 over substantially its entire surface, intimately contacts the land 29 over its entire exposed area, and penetrates into the groove 28 between the heating element 30 and the walls and root of the groove at all points except those at which heating element 30 contacts them. When thermocouple 60 ceases to demand cooling, the spray nozzle solenoid valves are shut off. Because the atomized water is almost instantly evaporated by contact with the barrel and heating elements, there is almost no lag in the cooling effect following the de-energizing of the spray nozzle solenoid valve.

In the preferred embodiment of the apparatus shown the control means energizes the solenoids of the spray nozzles in cyclically recurring pulses the duration of which is proportional to the deviation of the temperature of barrel from the desired temperature thereof. The spray type cooling, particularly when used in conjunction with the illustrated preferred pulse type controller described below, allows the barrel of the extruding machine to be accurately maintained within a narrow range of temperature deviation heretofore unobtainable. It will be understood, however, that in its broadest aspects the present invention does not require the use of a controller of the pulse type.

Referring now to Figs. 6 and 8, the manner in which the temperature of the apparatus is controlled by selectively heating and cooling zones of the barrel longitudinally thereof will be clear. In Fig. 6 there are shown, in effect, two essentially similar control circuits. The control circuit to the left of the dash line in Fig. 6 is for the two zones A and B at the delivery head of the barrel, whereas the circuit to the right of the dash line in Fig. 6 is for the control of the two zones of the barrel nearer the hopper end thereof. Detailed discussion of the control circuit will be confined to that at the left in Fig. 6. The main elements of the other such circuit are designated by the same reference characters as those employed for the circuit at the left, except with the addition of primes.

The heating and cooling means for the zones A and B of the barrel are under the control of the instrument 61, whereas such control of the two zones nearer the hopper are under the control of the similar instrument 62. Each of instruments 61 and 62 is, in the embodiment shown, a commercially available controller known as the pulse Pyro-O-Vane controller made by the Industrial Division of Minneapolis Honeywell Regulator Company. Each instrument has associated therewith a temperature sensing element, the thermocouple 60 having its leads 64 connected to the controller 61 as indicated in Fig. 6. Instrument 61 has a two throw, single pole controlling relay, the center pole of which is designated C and the two side poles of which are designated C' and $C^2$, respectively. In general, instrument 61 functions, when thermocouple 60 indicates that the barrel is too cold so that its relay closes the circuit between poles C and C'. When the thermocouple 60 demands cooling of the barrel, the circuit between poles C and $C^2$ is closed.

Instrument 61 provides positive snap action of its described relay at the set point, within the limits of the manually adjustable neutral zone. The instrument includes a galvanometer to the pointer of which is attached a light aluminum vane. As the temperature measured by thermocouple 60 approaches the set point, the galvanometer pointer swings to follow it, and the aluminum vane attached to the pointer moves between a pair of spiral coils whose position is determined by the set point index adjustment. Instrument 61 also includes a vacuum tube oscillator circuit of which the spiral coils are a part. The vane tends to shield one spiral coil from another and thereby reduces their total inductance. Since this inductance is the quantity which products oscillation of the circuit, oscillation ceases when the critical value or inductance is reached, and at this point the current through the relay suddenly decreases and snap action of the relay occurs. The portion of instrument 61 thus far described is the subject of the U. S. patent to Moore, No. 2,647,252.

Unit 61 also contains a second pair of coils between which rotates a synchronous motor-driven, calibrated second vane. The effect of the second pair of coils and second vane is to give the relay actuating point an oscillatory sweep about the set point. Thus, when the galvanometer pointer enters the set point zone, oscillation is prevented for part of the sweep cycle, and as the pointer moves deeper into the zone, the portion of the cycle during which oscillation occurs becomes shorter. Since the period of this time cycle is constant, the make-time of one set of relay contacts is proportional to the relative position of the pointer and set point index, that is, is proportional to the amount of deviation of the temperature of the barrel as sensed by thermocouple 60 from the predetermined desired temperature set on the instrument 61.

As indicated in Figs. 6 and 8, the control circuit for the heating means is provided with a primary contactor 65 and a secondary contactor 66, such contactors being open when their respective holding coils are de-energized. Contactors 65 and 66 supply each of the banks of heating elements connected in delta form, as shown in Fig. 8. The output poles $L_1'$, $L_2'$, and $L_3'$ of contactor 65 are connected to the apices of the delta, whereas the output poles $L_1^2$, $L_2^2$, and $L_3^2$ of contactor 66 are connected to the mid-points of the sides of the delta. The instrument 61 and the holding coils 70 and 71 of contactors 65 and 66, respectively, are supplied with reduced voltage operating current from the transformer 69 powered from the leads $L_2$ and $L_3$. The cotrol circuit is provided with a three position manually operated switch 67. In a first, heating only, position of switch 67 the contacts 85 and 87 are both open. In a second, combination heating and air cooling, position contacts 85 thereof are closed and contacts 87 remain open. In a third, heating and spray cooling, position of switch 67 both contacts 85 and 87 are closed. The heating elements are available at all times regardless of the positioning of switch 67, should thermocouple 60 require their operation, since wire 72 connects relay contact C' and the actuating solenoid 70 of contactor 65.

The operation and manner of connection of the control units will be more readily understood by following typical cycles of operation of the machine. It will be assumed that switch 67 has been placed in its first position and that the temperature measured by thermocouple 60 is slightly below the preset temperature, so that the movable contactor of the relay of instrument 61 is in position to close contacts C and C'. The holding coil 70 for contactor 65 is thus energized. Contactor 65 includes two auxiliary contacts 74 and 81 interposed in the low voltage control circuit, the auxiliary switches being connected to the moving portion of the main contactor so as to be simultaneously operated by holding coil 70. Switch 74 is of such construction that it is closed when the main contactor switch is open and vice versa. Switch 80 is of such construction that it is open when the main contactor is open and closed when the main contactor is closed.

The circuit for supplying heating element 76 of thermally responsive switch 75 leads through switch 74. Thus, when the main contactor of switch 65 is open, element 76 is heated, and when contactor 65 is closed, element 76 is de-energized. When sufficiently heated, the bimetallic switch element 77 thereof flexes to open the contacts of the switch 75. This opens the control circuit to holding coil 71 of contactor 66, thereby, in effect, cutting contactor 66 free from the control circuit and maintaining such contactor open.

At the assumed condition in which thermocouple 60 indicates that the barrel is slightly below the preset temperature, instrument 61 functions cyclically to close the circuit through its contacts C, C', whereby cyclically to energize holding coil 70 and thus repeatedly to open and close the main contacts of contactor 65. Initially, contactor 66 will remain inoperative, because thermal switch 75 will remain open when insufficiently heated. Each controlled zone of the barrel will thus receive cyclically repeated pulses or "slugs" of heat from its heating elements operating at half voltage, the length of each of the repeated heating pulses being proportional to the deviation of the temperature of the barrel from the desired preset temperature. As the main contacts of contactor 65 are repeatedly closed and opened, auxiliary contacts 74 will be repeatedly opened and closed, respectively, so that the heating element 76 of the thermal switch 75 likewise receives repeated heating pulses whose duration, however, is inversely proportional to the deviation of the temperature of the barrel from the desired preset temperature. When the controlled zone or zones of the barrel reach the desired temperature, the movable contactor of the relay of instrument 61 moves to open contacts C, C', thereby to de-energize the heating elements for such zone or zones.

When the deviation of the barrel temperature from that desired is small, heat supplied to the thermal switch 75 will more than make up that constantly lost to its environment, so that the secondary contactor 66 remains inoperative. The operator is apprised of operation of the heating means at low voltage by the lighting of the orange indicator lamp 84, which is supplied with current through the auxiliary contacts 79 on contactor 66. Contactor 79 is connected to the main movable contact element of means 66 so as to be closed when the main contacts thereof are open and open when the main contacts of means 66 are closed. Also in series with the supply line to lamp 84 are the contacts 80 on contactor 65, switch 80 being closed and opened when the main contactor of means 65 is closed and opened, respectively.

If the temperature of the barrel should drop still further, so as to require a more drastic heat input, this is automatically taken care of by the operation of thermal switch 75. We have seen above that the heating current for element 76 of the switch 75 is supplied in an amount inversely proportional to the deviation of the temperature of the barrel from the preset value. When the temperature of the barrel has dropped sufficiently, therefore, a point will be reached at which the heat supplied to coil 76 no longer balances the heat lost by switch 75 to its environment, so that the contacts 77 will then close. When this occurs, holding coil 71 of contactor 66 is energized so as to be under the control of the relay of instrument 61. Under this condition, as we have seen above, each heating element making up the delta of Fig. 8 is subjected to full voltage, so that heat is imparted to the barrel at a much greater rate. Under this condition, the orange lamp 84 is de-energized because auxiliary switch 80 will be open when auxiliary switch 79 is closed and vice versa. At the same time, during the heating of the barrel at a higher rate, a red light 82 connected in parallel with the holding coil 71 of contactor 66 is energized.

The motor 49 for the exhaust fan 47 is supplied through the conventional starter switch 86 shown in Fig. 6. Leads designated F, F extend to the fan motor to energize it when switch 86 is closed. Switch 86 is under the control of the manually operated switch 67, through a circuit obvious in Fig. 6, so that the fan motor is started when contacts 85 are closed and stopped when such contacts are opened. Because some types of operation of the apparatus require the application of heat to the barrel accompanied by abstraction of heat therefrom at a fairly low rate, the switch 67, as noted, is provided with a second position in which the fan motor is running at the same time that the heating means control circuit is energized. At this time, however, the spray cooling means is inoperative so that the barrel is cooled only by air drawn past it by the fan.

When the visual indicating means of the instrument 61 shows that the barrel is too hot, a condition which may occur due to internal heating of the plastic material being extruded, the operator first puts switch 67 in its second position wherein the zones A and B of the barrel controlled thereby are subjected to both heating and slow, air cooling, when thermocouple 60 demands heating of the barrel, or air cooling alone, when the controlled zone or zones of the barrel are too hot. When the barrel is too hot, with switch 67 in its second position, the relay of instrument 61 opens contacts C and C', thereby de-energizing the heating means. If such air cooling proves to be insufficient, so that the temperature of the controlled zones of the barrel continues to rise, the operator places the switch 67 in its third position, wherein contacts 85, to energize the fan, and contacts 87, to energize the spray cooling means control system, are closed. During extended runs of the extruding machine on one type of plastic material, temperature conditions of the barrel tend to become stabilized so that frequent changing of the position of switch 67 is not necessary.

As evident in Fig. 6, contacts 87 are in series with a circuit between the control contact C and the side contact $C^2$ of instrument 61. When thermocouple 60 indicates that the barrel is substantially hotter than the preset temperature on instrument 61, the circuit between contacts C and $C^2$ of the relay thereof are closed, and the solenoids of solenoid actuated valves 52' and $52^2$ are actuated to open such valves and thus to subject the zones A and B of the barrel to the cooling spray. A green signal light 89 in parallel with the cooling valve actuating solenoids informs the operator when the cooling means is in operation. Because it may be desired at least momentarily to render one or more of the spray heads inoperative, a manually operated toggle switch in series with the respective solenoid is provided at each solenoid. Such switches, designated 68 for the solenoids of zones A and B and 68' for the solenoids of the two zones adjacent the hopper end of the barrel, are shown in Figs. 1 and 6.

It will be evident from the above that the cooling means of the apparatus, as well as the heating means therefor, is controlled by the instrument 61 to operate in a series of cyclically recurring time-proportional pulses. The solenoid valves of the cooling system are opened so as to deliver pulses of cooling fluid in recurring cycles to the barrel; the length of each pulse is directly proportional to the amount by which the actual temperature of the barrel exceeds the predetermined desired temperature preset on the instrument. As a result, particularly with the liquid spray-air cooling mixture employed, and more particularly with the illustrated preferred extrusion machine barrel construction, the temperature of the barrel is controlled on both its heating and cooling cycles to be quickly responsive to heating and cooling as required, and to maintain the temperature of the barrel, and thus of its contents, within a very narrow range.

I claim as new the following:

1. Apparatus comprising a body to be heated, a plurality of similar electric resistance heating elements for heating the body, the elements being connected in a delta with at least one set of two elements adapted to be connected in series across each phase of a three-phase alternating current source, control means including means to detect the temperature of the body, and means operative in response to the temperature detecting means to energize the heating elements, said last named means including means normally connecting the source of current to the delta so that each heating element is subjected to full voltage, and means responsive to the delivery of a predetermined total quantity of energy in a predetermined time interval by the current source to the heating elements to alter the connection of such source to the delta so that each element is then subjected to half voltage.

2. Apparatus comprising a body to be heated, a source of three-phase alternating current, a plurality of similar elongated high temperature radiant electric resistance heating elements for heating the body, said elements lying outside the body and being spaced over the outer surface of the body to heat the body predominantly by radiation, the elements being connected in a delta with at least one set of two elements connected in series across each phase of the current source, control means to detect the temperature of the body, and means operative in response to the temperature detecting means to energize the heating elements, said last named means including means normally connecting the source of current to the delta so that each heating element is subjected to full voltage, and means responsive to the delivery of a predetermined total quantity of energy in a predetermined time interval by the current source to the heating elements to alter the connection of such source to the delta so that each element is then subjected to half voltage.

3. Apparatus as claimed in claim 2, wherein the means responsive to the delivery of a predetermined total quantity of energy in a predetermined time interval comprises a time delay switch having a switch actuating means energized by the flow of element heating current through the primary contactor.

4. Apparatus comprising a body to be heated, a source of three-phase alternating current, a plurality of similar elongated high temperature radiant electric resistance heating elements for heating the body, said elements lying outside the body and being spaced over its outer surface so as to heat the body predominantly by radiation, the elements being connected in a delta with at least one set of two elements connected in series across each phase of the current source, control means including means to detect the temperature of the body, and means operative in response to the temperature detecting means to energize the heating elements, said last named means including a primary contactor and a secondary contactor connected to the source of current, the respective leads of the primary contactor being connected to the apices of the delta, the respective leads of the secondary contactor being connected to the mid-points of the delta so that when the primary and secondary contactors are both closed each heating element thereof is subjected to full voltage and when the primary contactor is closed and the secondary contactor is open each heating element is subjected to half voltage, and means responsive to the delivery of a predetermined total quantity of energy in a predetermined time interval by the current source at full voltage to each of the heating elements to open and render inoperative the secondary contactor whereby the delta is supplied with current through the primary contactor only and each heating element is then subjected to half voltage.

5. Apparatus as claimed in claim 4, wherein the means energizing the heating elements operates in cyclically recurring pulses.

6. Apparatus as claimed in claim 4, wherein the primary contactor and the secondary contactor are connected in parallel to the source of current.

7. Apparatus comprising a body to be heated, a source of three-phase alternating current, a plurality of similar elongated high temperature radiant electric resistance heating elements for heating the body, said elements lying outside the body and being spaced over its outer surface so as to heat the body predominantly by radiation, the elements being connected in a delta with at least one set of two elements connected in series across each phase of the current source, control means including means to detect the temperature of the body, and means operative in response to the temperature detecting means to energize the heating elements in cyclically recurring pulses of a duration proportional to the deviation of the temperature of the body from the desired temperature, said last named means including a primary contactor and a secondary contactor connected in parallel to the source of current, the respective leads of the primary contactor being connected to the apices of the delta, the respective leads of the secondary contactor being connected to the mid-points of the delta so that when the primary and secondary contactors are both closed each heating element thereof is subjected to full voltage and when the primary contactor is closed and the secondary contactor is open each heating element is subjected to half voltage, and means responsive to the delivery of a predetermined total quantity of energy in a predetermined time interval by the current source at full voltage to each of the heating elements to open and render inoperative the secondary contactor whereby the delta is supplied with current through the primary contactor only and each heating element is then subjected to half voltage.

8. Apparatus comprising a body to be heated, a source of three-phase alternating current, a plurality of similar elongated high temperature radiant electric resistance heating elements for heating the body, the elements being connected in a delta with at least one set of two elements connected in series across each phase of the current source, control means including means to detect the temperature of the body, and means operative in response to the temperature detecting means to energize the heating elements, said last named means including a primary contactor, and a secondary contactor connected to the source of current, the respective means of the primary contactor being connected to the apices of the delta, the respective leads of the secondary contactor being connected to each side of the delta, the primary and secondary contactors when both are closed connecting the source of current to the delta so that each heating element is subjected to full voltage and when the primary contactor is closed and the secondary contactor is open each heating element is subjected to half voltage, a time delay switch having a switch actuating means energized by the flow of element heating current through the primary contactor to open and render inoperative the contacts of the secondary contactor after a predetermined total quantity of energy in a predetermined time interval has been delivered by the current source to the heating elements, whereby the delta is then supplied with current through the primary contactor only and each heating element is then subjected to half voltage.

9. Apparatus as claimed in claim 8, wherein the means energizing the heating elements operates in cyclically recurring pulses.

10. Apparatus as claimed in claim 8, wherein the primary and secondary contactor are connected in parallel to the source of current.

11. Apparatus comprising a body to be heated, a source of three-phase alternating current, a plurality of similar elongated high temperature radiant electric resistance heating elements for heating the body, said elements lying outside the body and being spaced over its outer surface so as to heat the body predominantly by radiation, the elements being connected in a delta with at least one set of two elements connected in series across each phase of the current source, control means including means to detect the temperature of the body, and means operative in response to the temperature detecting means to energize the heating elements in cyclically recurring pulses of a duration proportional to the deviation of the temperature of the body from the desired temperature, said last named means including a primary contactor, and a secondary contactor connected in parallel to the source of current, the respective means of the primary contactor being connected to the apices of the delta, the respective leads of the secondary contactor being connected to each side of the delta, the primary and secondary contactors when both are closed connecting the source of current to the delta so that each heating element is subjected to full voltage and when the primary contactor is closed and the secondary contactor is open each heating element is subjected to half voltage, a time delay switch having a switch actuating means energized by the flow of element heating current through the primary contactor to open and render inoperative the contacts of the secondary contactor after a predetermined total quantity of energy in a predetermined time interval has been delivered by the current source to the heating elements, whereby the delta is then supplied with current through the primary contactor only and each heating element is then subjected to half voltage.

References Cited in the file of this patent

UNITED STATES PATENTS

| | | |
|---|---|---|
| 1,625,380 | Talley | Apr. 19, 1927 |
| 1,638,857 | Keene | Aug. 16, 1927 |
| 1,798,678 | Keller | Mar. 31, 1931 |
| 1,988,845 | Jewett | Jan. 22, 1935 |
| 2,078,791 | Cypra | Apr. 27, 1937 |
| 2,721,729 | Van Riper | Oct. 25, 1955 |
| 2,727,129 | Davis | Dec. 13, 1955 |